(12) United States Patent
Oh

(10) Patent No.: US 8,884,667 B2
(45) Date of Patent: Nov. 11, 2014

(54) TOUCH PANEL SYSTEM WITH DELAY COMPENSATION CAPABILITY AND METHOD FOR COMPENSATING DELAY IN TOUCH PANEL SYSTEM

(75) Inventor: Do-Hwan Oh, Seoul (KR)

(73) Assignee: Melfas Inc., Seoul (KR)

( * ) Notice: Subject to any disclaimer, the term of this patent is extended or adjusted under 35 U.S.C. 154(b) by 208 days.

(21) Appl. No.: 13/493,105

(22) Filed: Jun. 11, 2012

(65) Prior Publication Data

US 2012/0313675 A1 Dec. 13, 2012

(30) Foreign Application Priority Data

Jun. 10, 2011 (KR) ........................ 10-2011-0056154

(51) Int. Cl.
*H03L 7/00* (2006.01)
*G06F 3/041* (2006.01)
*G06F 3/044* (2006.01)

(52) U.S. Cl.
CPC .................................. *G06F 3/0416* (2013.01); *G06F 3/044* (2013.01)
USPC ........................................................ 327/142

(58) Field of Classification Search
CPC ........... G06F 3/041; G06F 3/044; G01L 9/00; G04F 10/005
USPC ............................ 345/173; 178/18.06; 73/753
See application file for complete search history.

(56) References Cited

U.S. PATENT DOCUMENTS

| 8,261,619 B2 * | 9/2012 | Shin et al. ........................ 73/753 |
| 2005/0111537 A1 | 5/2005 | Sunter et al. |
| 2008/0011404 A1 | 1/2008 | Lee et al. |
| 2008/0204422 A1 * | 8/2008 | Moon et al. .................... 345/173 |
| 2009/0095542 A1 * | 4/2009 | Moon et al. ................ 178/18.06 |

FOREIGN PATENT DOCUMENTS

| CN | 1158767 | 7/2004 |
| KR | 10-2006-0131579 | 12/2006 |
| KR | 10-2010-0104245 | 9/2010 |
| TW | 200701639 | 1/2007 |
| TW | 200721695 | 6/2007 |

* cited by examiner

*Primary Examiner* — Dwayne Bost
*Assistant Examiner* — Chineyere Wills-Burns
(74) *Attorney, Agent, or Firm* — McKenna Long & Aldridge LLP

(57) ABSTRACT

A touch panel system includes a signal generator configured to generate a reference signal and one or more channels. Each of the channels comprises a sensing unit configured to sense a touch thereon to output a sensing signal indicative of the touch; and a delay unit configured to adjust the reference signal based on a delay compensation value to compensate delay of the reference signal caused by the difference of distance between the signal generator and the channel. Further, each of the channels comprises an operation unit configured to perform an operation on the sensing signal and the reference signal from the delay unit to produce an operation result representing difference between the sensing signal and the adjusted reference signal; and a controller configured to determine the delay compensation value of the delay unit in each channel based on the voltage signal from the operation unit.

13 Claims, 3 Drawing Sheets

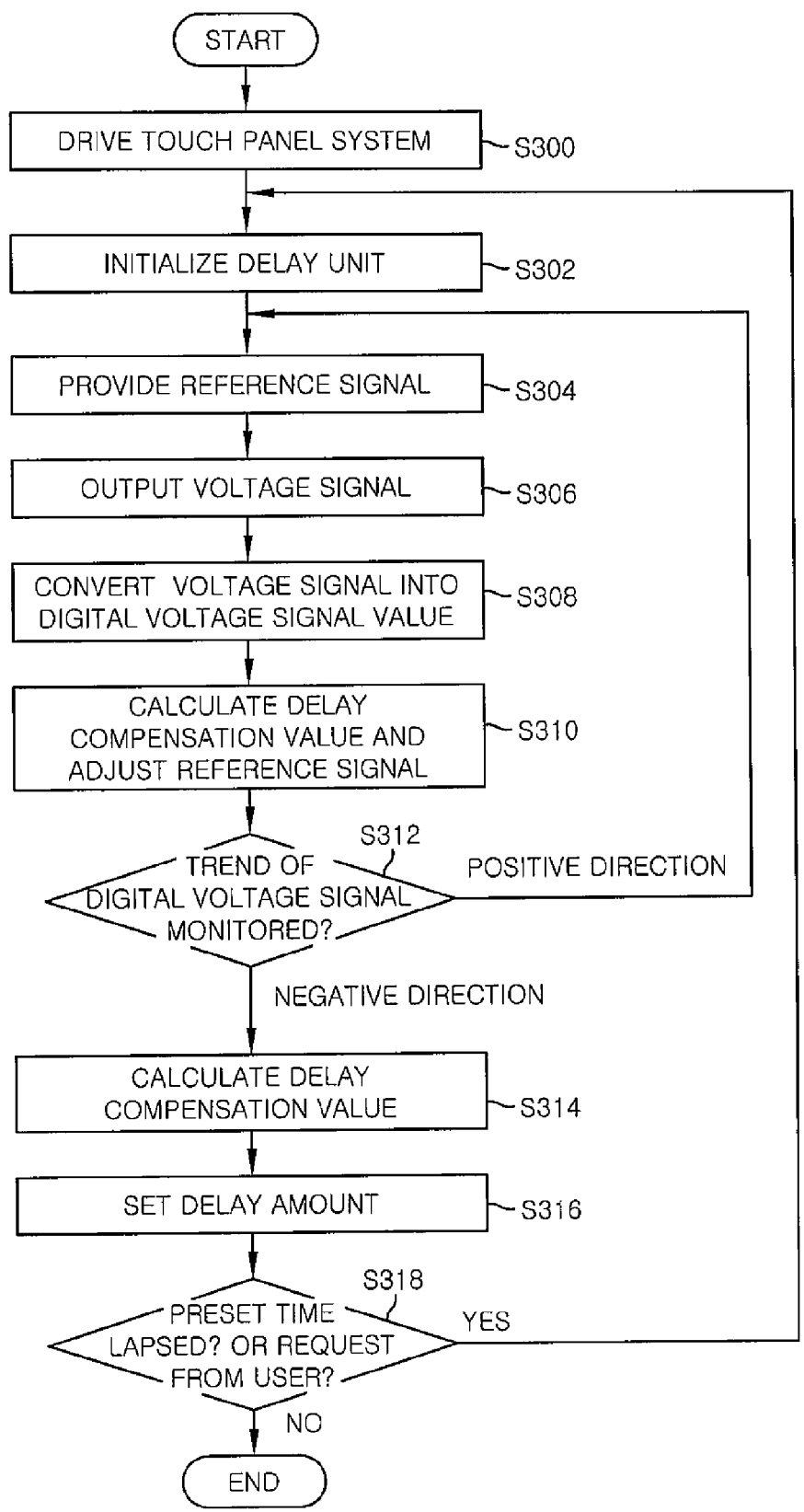

TOUCH PANEL SYSTEM WITH DELAY COMPENSATION CAPABILITY AND METHOD FOR COMPENSATING DELAY IN TOUCH PANEL SYSTEM

CROSS-REFERENCE TO RELATED APPLICATIONS

The present invention claims priority of Korean Patent Application No. 10-2011-0056154, filed on Jun. 10, 2011 which is incorporated herein by reference.

FIELD OF THE INVENTION

The present invention relates to a touch panel system; and more particularly to a touch panel system and a method for compensating delay caused by distances among channels and delay caused by surroundings.

BACKGROUND OF THE INVENTION

A touch panel system is designed to estimate a position of a touch and to process a specific function when a finger or an object touches a text displayed on a screen or a specific position of the screen without using an input device such as a keyboard, a mouse, and the like. The touch panel system is employed in various apparatuses, such as mobile phones, PDA (Personal Digital Assistants, notebook computers, navigation devices, PMPs (Portable Media Players), portable gaming devices, and the like. There are several types of this touch panel system such as a resistive touch panel system, a surface acoustic wave touch panel system, an infrared shield touch panel system, an electromagnetic induction touch panel system, and a capacitive touch panel system.

The capacitive touch panel system is classified into a type of determining a touch input using a self-capacitance generated between a touching object and a sensing electrode without applying a specific driving signal thereto and a type of determining a touch input using mutual-capacitance generated a touching object and a plurality of sensing electrodes while applying a specific driving signal thereto. The touch panel system using the self-capacitance has a simple circuit and is easily practiced but multi-touch is not easily determined. On the other hand, the touch panel system using mutual-capacitance is advantageous of determining multi-touch over the self-capacitance touch panel system, but it has a disadvantage of an increased thickness because of dual layer structure thereof. Each of these touch panel system includes, in general, a window to which a user's finger or an object is touched directly, a sensing electrode of a preset pattern, and a controller analyzing an electric signal provided from the sensing electrode to determine a position where a touch occurs. Here, the sensing electrode includes a plurality of channels and each of the channels corresponds to a touch sensing area.

The touch panel system may determine a touched position within a touch sensing area based on an electric characteristic obtained by comparing a sensing signal transmitted from each of the channels of the sensing electrode and a reference signal.

In the touch panel system as described above, a reference signal that is input into the respective channels may be delayed according to distances among the respective channels. That is, the reference signal is not delayed on a channel near a signal supplying line to which the reference signal is supplied but on a channel far from the signal supplying line. Due to this delay, the touched position cannot be precisely determined.

Especially, as a recent touch panel system is increasing in size, accuracy of touches is remarkably deteriorated due to the delay. That is, as a display device employing the touch panel system is increasing in the size, a distance between first and last channels to which the reference signal is provided becomes far from each other, which may introduce the delay into the touch panel system. Accordingly, the touch accuracy may be remarkably deteriorated.

Moreover, when the reference signal provided to the respective channels is changed depending on surroundings, the touch accuracy may also deteriorated.

SUMMARY OF THE INVENTION

In view of the above, the present invention provides a touch panel system and method for compensating a delay of a reference signal, that is provided to respective channels in a touch panel system, caused by distances among the respective channels.

Further, the present invention provides a touch panel system and method for compensating a delay of the reference signal that is varied with surroundings.

In accordance with a first aspect of the present invention, there is provided a touch panel system including: a signal generator configured to generate a reference signal; one or more channels, wherein each of the channels are configured to detect a touch; a sensing unit configured to sense the touch to output a sensing signal indicative of the touch event; a delay unit configured to receive the reference signal and adjust the reference signal based on a delay compensation value to compensate delay of the reference signal caused by the difference of distance between the signal generator and each of the channel; an operation unit configured to perform an operation on the sensing signal and the reference signal from the delay units to produce an operation result representing the difference between the sensing signal and the adjusted reference signal; and a controller configured to determine the delay compensation value of the delay unit in each channel based on the operation result from the operation unit.

Further, the touch panel system may further include a reset signal generator configured to provide a reset signal or the adjusted reference signal to the delay unit in each channel by a user's request, at a preset time period, or at the driving of the touch panel system.

Each of the channels may further comprise an A/D converter configured to convert the operation result in the form of analog signal into a digital signal and outputs the converted digital signal to the controller.

The controller may comprise a delay calculator configured to calculate the delay compensation value of the delay unit in each channel based on the digital signal outputted from the operation unit.

Further, the controller may comprise an initializer configured to generate the reset signal for allowing the reset signal generator to initialize the delay compensation value set to the delay unit in each channel.

Furthermore, the controller may further comprise a delay setting unit configured to set an amount of delay of the reference signal corresponding to the delay compensation value.

The delay calculator may monitor a turning point at which the digital signal turns toward a negative direction from the positive direction to calculate the delay compensation value as the digital signal at the turning point.

Each of the channels may comprise a plurality of A/D converters configured to convert a voltage signal in the form of analog signal from the operation unit into a digital signal, wherein two or more channels share one A/D converter.

The delay unit may adjust phase of the reference signal based on the delay compensation value and provides the adjusted reference signal to the operation unit.

Further, the delay unit may include flip-flops.

In accordance with a second aspect of the present invention, there is provided a method for compensating delay of a reference signal caused by the difference of distances among channels in a touch panel system. The method includes initializing each of the channels; obtaining a operation signal representing the difference between the reference signal and a sensing signal indicative of a touch made on the channel; calculating a delay compensation value of the channel based on the operation signal; and adjusting the reference signal based on the delay compensation value to compensate the delay of the reference signal.

The method may further comprise converting the operation signal in the form of analog signal into a digital signal and outputs the converted digital signal to the controller.

Further, said calculating a delay compensation value of the channel may comprise monitoring a turning point at which the digital signal turns toward a negative direction from the positive direction; and calculating the delay compensation value as the voltage signal at the turning point.

Furthermore, said adjusting the reference signal may comprise adjusting phase of the reference signal based on the delay compensation value.

In accordance with an embodiment of the present invention, respective delay units that are installed at front ends of operation units for processing sensing signals outputted from sensing units of respective channels and reference signals are reset, delay values of the respective channels are calculated by comparing the output signals from the channels with the reference signals, and the setting values of the operation unit are changed based on the calculated delay values so that the delay values depending on changes of the sensing units may be compensated and touch accuracy may be enhanced.

BRIEF DESCRIPTION OF THE DRAWINGS

FIG. 3 is a flow chart illustrating a method for compensation a delay in the touch panel system in accordance with an embodiment of the present invention.

DETAILED DESCRIPTION OF THE EMBODIMENTS

Figure 1:
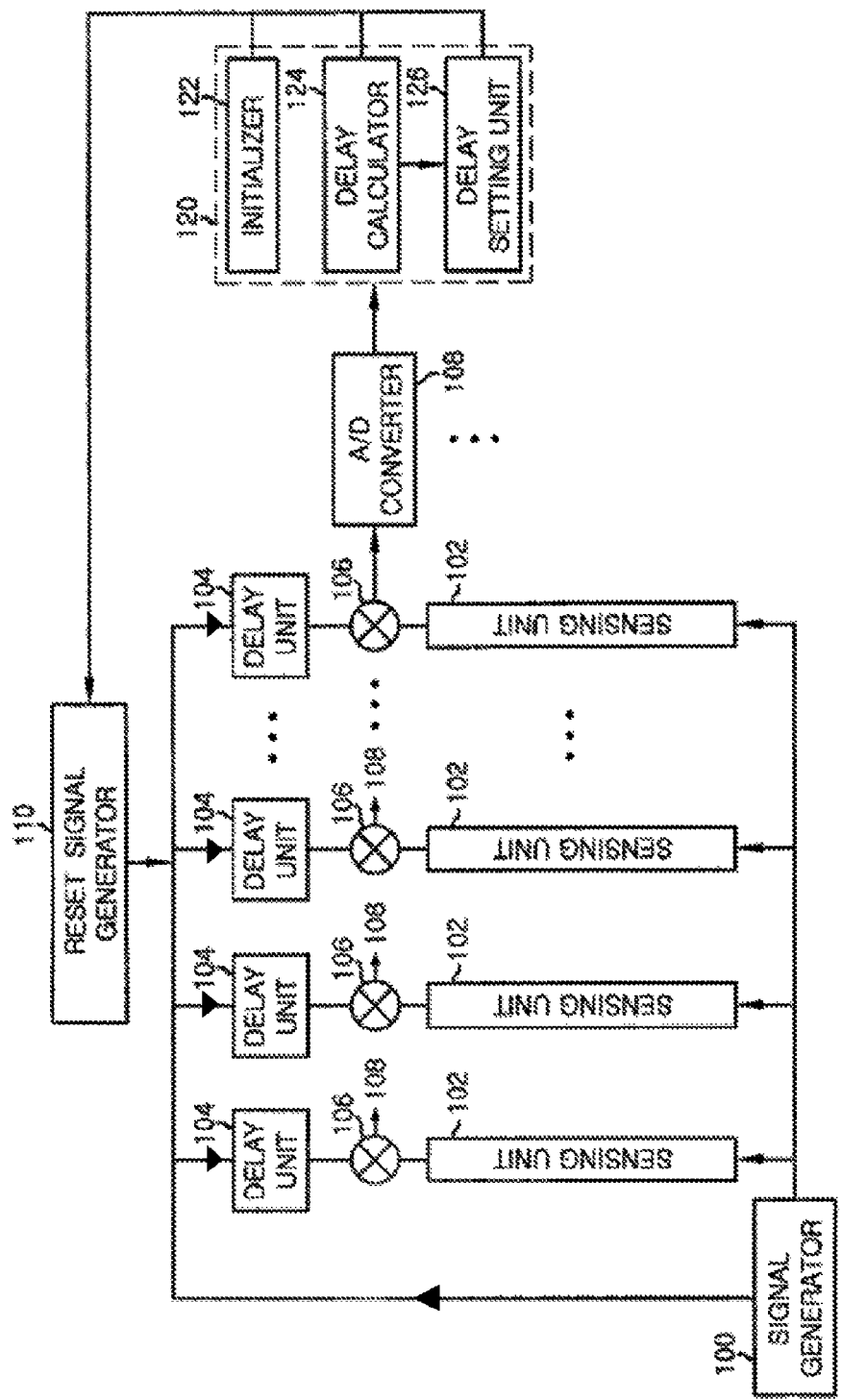
FIG. 1 is a block diagram illustrating a touch panel system including a delay compensating apparatus in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described with reference to the accompanying drawings which form a part hereof.

FIG. 1 is a block diagram illustrating a touch panel system including a delay compensating apparatus in accordance with an embodiment of the present invention. The touch panel system includes a signal generator 100, a plurality of sensing units 102 installed at their respective corresponding channels, a plurality of delay units 104, a plurality of operation units 106, a plurality of A/D converters 108, a reset signal generator 110, and a controller 120.

The signal generator 100 generates a reference signal and supplies the reference signal to the sensing units 102 of the respective channels. The reference signal is also supplied to the operation units 106 via the delay units 104. The reference signal supplied to each of the sensing units 102 may be adjusted depending on detection of a touch sensed by the sensing unit 102 and then provided to a corresponding operation unit 106.

When a touch is applied to a touch detecting area, capacitance of the sensing unit 102 is changed with the applied touch. The sensing unit 102 then generates a sensing signal indicative of the touch in which phase of the reference signal is changed according to the change of the capacitance and provides the sensing signal to its corresponding operation unit 106.

Each of the delay units 104 adjusts phase of the reference signal supplied from the signal generator 100 based on a delay compensation value provided from the controller 120 and provides the adjusted reference signal to its corresponding operation unit 106, thereby compensating delay of the reference signal in the channel, which may be occurred by distance between the signal generator and the channel.

The delay compensation value may represent the amount of delay in the phase of the reference signal and is determined by the controller 120. The delay unit 104 may include, but not limited to, flip-flops such as D flip-flops that adjust the reference signal to have a different phase. The reference signal with the adjusted phase from the delay unit 104 is provided to the operation unit 106.

The operation unit 106 processes the reference signal provided from the delay unit 104 and the sensing signal outputted from the sensing unit 102, and outputs the processed signal to its corresponding A/D converter 108. That is to say, the operation unit 106 mixes the reference signal adjusted by the delay compensation value and the sensing signal, and converts the mixed signal into a voltage signal. More specifically, in each of the operation units 106, an adjusted reference signal is compared with a sensing signal in terms of frequency and phase. As a result of the comparison, the operation unit 106 outputs an operation result, e.g., voltage signal with a relatively high value when the adjusted reference signal and the sensing signal are matched closely, while it outputs a voltage signal with a relatively low value when they are not matched closely. The A/D converter 108 converts the processed result, i.e., the voltage signal in the form of analog signal into a digital voltage signal and outputs the converted digital voltage signal to the controller 120. The controller 120 determines the delay compensation value of each channel based on the digital voltage signal from the A/D converter 108 and provides the determined delay compensation value to the delay unit 104 of the channel through the delay setting unit 126. For example, when receiving the voltage signal with a relatively low value due to a low match from the delay unit 104, the controller 120 allows the delay unit 104 to provide a reference signal of upper level to the delay unit 104 based on the delay compensation value. The operation unit 106 receives the adjusted reference signal from the delay unit 104 and compares phase of the adjusted reference signal with that of the sensing signal. A phase difference between two signals is converted into a digital voltage value and the converted digital value is then provided to the controller 120 for the monitoring of the match. This monitoring may be repeated until the adjusted reference signal and the sensing signal are closely matched in phases to yield a voltage signal with a relatively high value.

The delay compensation value is ultimately determined based on an adjusted reference signal by which a digital voltage value resulting from the repetitive comparison of phase difference becomes maximum. Hence, the delay unit 104 delays the reference signal from the signal generator 100 based on the delay compensation value and outputs the compensated reference signal to the operation unit 106. Further, the controller 120 controls the reset signal generator 110 so that the reset signal generator 110 provides a reset signal to the delay units 104. The reset signal may be generated at a preset time period and when or after booting a terminal provided with a touch panel system. The delay units 104 are initialized by the reset signal to output the reference signals from the signal generator 100 without compensation to the respective operation units 106.

To this end, the controller 120 includes an initializer 122, a delay calculator 124, and a delay value setting unit 126.

The initializer 122 controls the reset signal generator 110, so that the reset signal generator 110 generates the reset signal and initializes the delay units 104 with the reset signals. The initializer 122 may drive the reset signal generator 110 to initialize the delay units 104 at a preset time period after the touch panel system is driven, at the first driving of the touch panel system, or by a user's request.

The delay calculator 124 calculates delay compensation values for the respective delay units 104 based on the output values provided from the operation units 106. The calculated delay compensation values are then provided to the delay units 104, respectively, through the delay setting unit 126.

Further, whenever the reference signal is initialized by the reset signal generator 110 or adjusted by the delay unit 104, the delay calculator 124 monitors the digital voltage signal provided from the A/D converter 108 to calculate the delay compensation value based on drift in the digital voltage signal. More specifically, the delay calculator 124 allows the reference signal to be repeatedly adjusted by the delay compensation value during the drift in the digital voltage signal continue in a positive direction, and recognizes a turning point at which the digital voltage signal turns toward a negative direction from the positive direction and ultimately calculates the delay compensation value as the digital voltage signal at the turning point. The delay compensation value is provided to the delay unit 104 through the delay setting unit 126.

The delay setting unit 126 sets an amount of delay of the reference signal corresponding to the delay compensation value calculated by the delay calculator 124. Consequently, the delay units 104 adjust phases of the reference signals as much as the delay compensation values to provide the compensated reference signals to the operation units 106.

The reset signal generator 110 is driven by the initializer 122 to initialize the respective delay units 104. That is, the reset signal generator 110 generates a reset signal to initialize the delay compensation values set to the respective delay units 104.

The operation of the touch panel system will be described with reference to FIG. 2.

Figure 2:
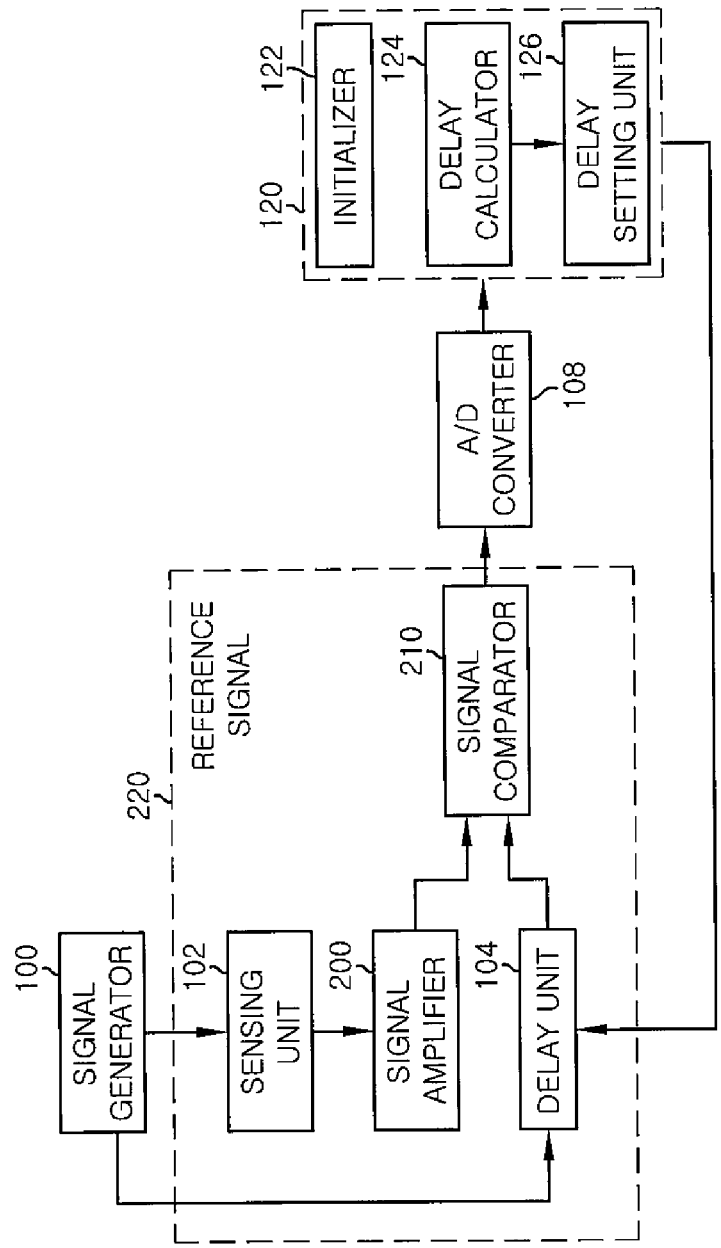
FIG. 2 is a detailed block diagram illustrating a touch panel system including the delay compensating apparatus in accordance with an embodiment of the present invention.

FIG. 2 is a detailed block diagram of a channel in the touch panel system in accordance with an embodiment of the present invention. The touch panel system includes a signal amplifier 200 connected to the sensing unit 102 and a signal comparator 210 connected to the delay unit 104.

As illustrated in FIG. 2, the signal generator 100 generates and provides the reference signals to the delay unit 104 and the sensing unit 102, and the sensing unit 102 outputs the sensing signal to the signal amplifier 200.

The signal amplifier 200 amplifies the sensing signal received from the sensing unit 102 and outputs the amplified sensing signal to the signal comparator 210.

The signal comparator 210, which refers to the operation unit 106 illustrated in FIG. 1, mixes the reference signal adjusted in the delay unit 104 with the amplified sensing signal, that is, compares phase and frequency of the adjusted reference signal with that of the amplified sensing signal and outputs corresponding voltage signal based on the comparison result. For example, as a result of comparing the adjusted reference signal with the amplified sensing signal, when the adjusted reference signal is closely matched with the amplified sensing signal in phase and frequency, the signal comparator 210 outputs a voltage signal with a high value, and, if not, outputs a voltage signal with a low value.

The voltage signal outputted from the signal comparator 210 is converted into a digital voltage signal by the A/D converter 108 to be outputted to the controller 120 and the controller 120 detects a touch and a position of the touch. The controller also sets the delay compensation value of the delay unit 104 using the digital voltage signal.

Although it has been illustrated that each A/D converter 108 is installed at the output end of its corresponding operation unit 106 in this embodiment, two or more channels may share a single A/D converter 108. That is, a single A/D converter 108 may be configured to receive the outputs from two or more operation units 106.

According to the delay compensating apparatus in accordance with the embodiment of the present invention, the reference signals are provided to the operation units 106 of the respective channels after phases of the reference signals are adjusted by the delay compensation value so that the delay caused by the distances among the channels can be compensated.

Moreover, according to the delay compensating apparatus in accordance with the embodiment of the present invention, the delay of the reference signal in each delay unit 104 are compensated by the delay compensation value so that the delay caused by surroundings can also be compensated. The compensation of surroundings may comprise any change or occurrences of parasite capacitance incurred by environmental temperature.

Hereinafter, an operation of the touch panel system as described above will be described with reference to FIG. 3.

FIG. 3 is a flow chart illustrating a method for compensation a delay performed in the touch panel system in accordance with an embodiment of the present invention.

As illustrated in FIG. 3, as the touch panel system is driven in step S300, the initializer 122 of the controller 120 drives the reset signal generator 110 to generate a reset signal. The reset signal is input to the respective delay units 104 and therefore the delay compensation values in the delay units 104 are initialized in step S302.

In step S304, the signal generator 100 provides the reference signal to the sensing units 102 and the delay units 104. Each of the sensing units 102 generates a sensing signal to provide it to each of the operation units 106, respectively. Further, each of the delay units 104 outputs the reference signal from the signal generator 100 to each of the operation units 106, respectively, without delay.

In step S306, each of operation unit 106 outputs the voltage signal obtained by comparing the sensing signal from its corresponding sensing unit 102 with the reference signal from its corresponding delay unit 104 to its corresponding A/D converter 108.

Subsequently, in step S308, the A/D converter 108 converts the voltage signal into the digital voltage signal and outputs the same to the controller 120.

The delay calculator 124 in the controller 120 calculates the delay compensation value for the delay unit 104 based on the digital voltage signal from the A/D converter 108, so that the reference signal is adjusted by the delay compensation value in the delay unit 104 in step S310.

During the repetition of the calculation of the delay compensation value, in step S312, if it is monitored that a trend of the digital voltage signal keeps going in the positive direction, the delay calculator 124 repeats the steps S304, S306, S308 and S310 of sequentially providing the reference signal, outputting the voltage signal, converting the voltage signal into the digital voltage signal, and adjusting the reference signal.

However, as a result of the monitoring in step S312, if it is monitored that the digital voltage signal has a trend to turn toward the negative direction from the positive direction, the delay calculator 124 recognizes the turning point to calculate the delay compensation value as the digital voltage signal at the turning point in step S314, and provides the delay compensation value to the delay setting unit 126.

In step S316, the delay setting unit 126 in the controller 120 then sets the delay amount by the delay units 104 based on the delay compensation value. Accordingly, the delay unit 104 compensates the reference signal based on the delay compensation value and output the compensated reference signal to the operation unit 106.

After that, in step S318, if it is determined that a preset time has lapsed after driving the touch panel system or a user makes a request, the method then goes back to step S302 and the controller 120 initializes the respective delay unit 104 by the initializer 122 and performs the operation as set forth above.

According to the delay compensating method of the embodiment of the present invention, the delay for the respective delay units 104 caused by the surroundings may also be compensated by initializing the delay compensation values set to the delay units 104 and by compensating the delay compensation values of the respective delay units 104.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A touch panel system comprising:
a signal generator configured to generate a reference signal;
one or more channels, wherein each of the channels are configured to detect a touch;
a sensing unit configured to sense the touch to output a sensing signal indicative of the touch event;
a delay unit configured to receive the reference signal and adjust the reference signal based on a delay compensation value to compensate delay of the reference signal caused by the difference of distance between the signal generator and each of the channel;
an operation unit configured to perform an operation on the sensing signal and the reference signal from the delay units to produce an operation result representing the difference between the sensing signal and the adjusted reference signal;
a controller configured to determine the delay compensation value of the delay unit in each channel based on the operation result from the operation unit; and
a reset signal generator configured to provide a reset signal or the adjusted reference signal to the delay unit in each channel by a user's request, at a preset time period, or at the driving of the touch panel system.

2. The touch panel system of claim 1, wherein each of the channels further comprise an A/D converter configured to convert the operation result in the form of analog signal into a digital signal and outputs the converted digital signal to the controller.

3. The touch panel system of claim 2, wherein the controller comprises a delay calculator configured to calculate the delay compensation value of the delay unit in each channel based on the digital signal outputted from the operation unit.

4. The touch panel system of claim 3, wherein the controller comprises an initializer configured to generate the reset signal for allowing the reset signal generator to initialize the delay compensation value set to the delay unit in each channel.

5. The touch panel system of claim 4, wherein the controller further comprises a delay setting unit configured to set an amount of delay of the reference signal corresponding to the delay compensation value.

6. The touch panel system of claim 2, wherein the delay calculator monitors a turning point at which the digital signal turns toward a negative direction from the positive direction to calculate the delay compensation value as the digital signal at the turning point.

7. The touch panel system of claim 1, wherein each of the channels comprise a plurality of A/D converters configured to convert a voltage signal in the form of analog signal from the operation unit into a digital signal, wherein two or more channels share one A/D converter.

8. The touch panel system of claim 1, wherein the delay unit adjusts phase of the reference signal based on the delay compensation value and provides the adjusted reference signal to the operation unit.

9. The touch panel system of claim 1, wherein the delay unit includes flip-flops.

10. A method for compensating delay of a reference signal caused by the difference of distances among channels in a touch panel system, the method comprising:
initializing each of the channels;
obtaining a operation signal representing the difference between the reference signal and a sensing signal indicative of a touch made on the channel;

calculating a delay compensation value of the channel based on the operation signal;

adjusting the reference signal based on the delay compensation value to compensate the delay of the reference signal; and providing a reset signal or the adjusted reference signal to each channel by a user's request, at a preset time period, or at the driving of the touch panel system.

11. The method of claim 10, further comprising: converting the operation signal in the form of analog signal into a digital signal and outputs the converted digital signal to the controller.

12. The method of claim 11, wherein said calculating a delay compensation value of the channel comprise: monitoring a turning point at which the digital signal turns toward a negative direction from the positive direction; and calculating the delay compensation value as the voltage signal at the turning point.

13. The method of claim 10, said adjusting the reference signal comprises adjusting phase of the reference signal based on the delay compensation value.

* * * * *